(12) United States Patent
Wüster

(10) Patent No.: US 6,389,742 B1
(45) Date of Patent: May 21, 2002

(54) RETAINING WALL FOR RAISED PLANTING BED

(76) Inventor: Heinrich Wüster, Unterm Hohen Rain 16, A-6460 Imst (Tirol) (AT)

( * ) Notice: Subject to any disclaimer, the term of this patent is extended or adjusted under 35 U.S.C. 154(b) by 0 days.

(21) Appl. No.: 09/384,766

(22) Filed: Aug. 27, 1999

(30) Foreign Application Priority Data

Aug. 28, 1998 (AT) .............................................. 1473/98

(51) Int. Cl.⁷ .............................. A01G 1/00; E04B 2/00
(52) U.S. Cl. ......................................... 47/33; 52/586.1
(58) Field of Search .......................... 47/33; 404/6, 7; 405/284; 52/586.1, 585.1, 285.1

(56) References Cited

U.S. PATENT DOCUMENTS

| | | | |
|---|---|---|---|
| 4,869,018 A | 9/1989 | Scales | |
| 5,283,994 A | * 2/1994 | Callison | 47/33 |
| 5,291,708 A | * 3/1994 | Johnson | 47/33 |
| 5,442,877 A | * 8/1995 | Lindhal | 47/33 |

FOREIGN PATENT DOCUMENTS

| | | |
|---|---|---|
| CH | 692 90 | 7/1914 |
| DE | 91 07 366 | 11/1991 |
| EP | 0 716 803 | 6/1996 |

\* cited by examiner

*Primary Examiner*—Charles T. Jordan
*Assistant Examiner*—Floris C Copier
(74) *Attorney, Agent, or Firm*—Herbert Dubno; Andrew Wilford

(57) ABSTRACT

A retaining-wall system has a plurality of substantially identical wall elements each having an elongated and downwardly open body with opposite ends each formed with a connection having an upwardly directed connection formation and at least one splice element having a body engageable between the wall elements above the connections and having a pair of downwardly directed connection formations complementarily interfittable with the upwardly directed connection formations of the wall elements.

13 Claims, 2 Drawing Sheets

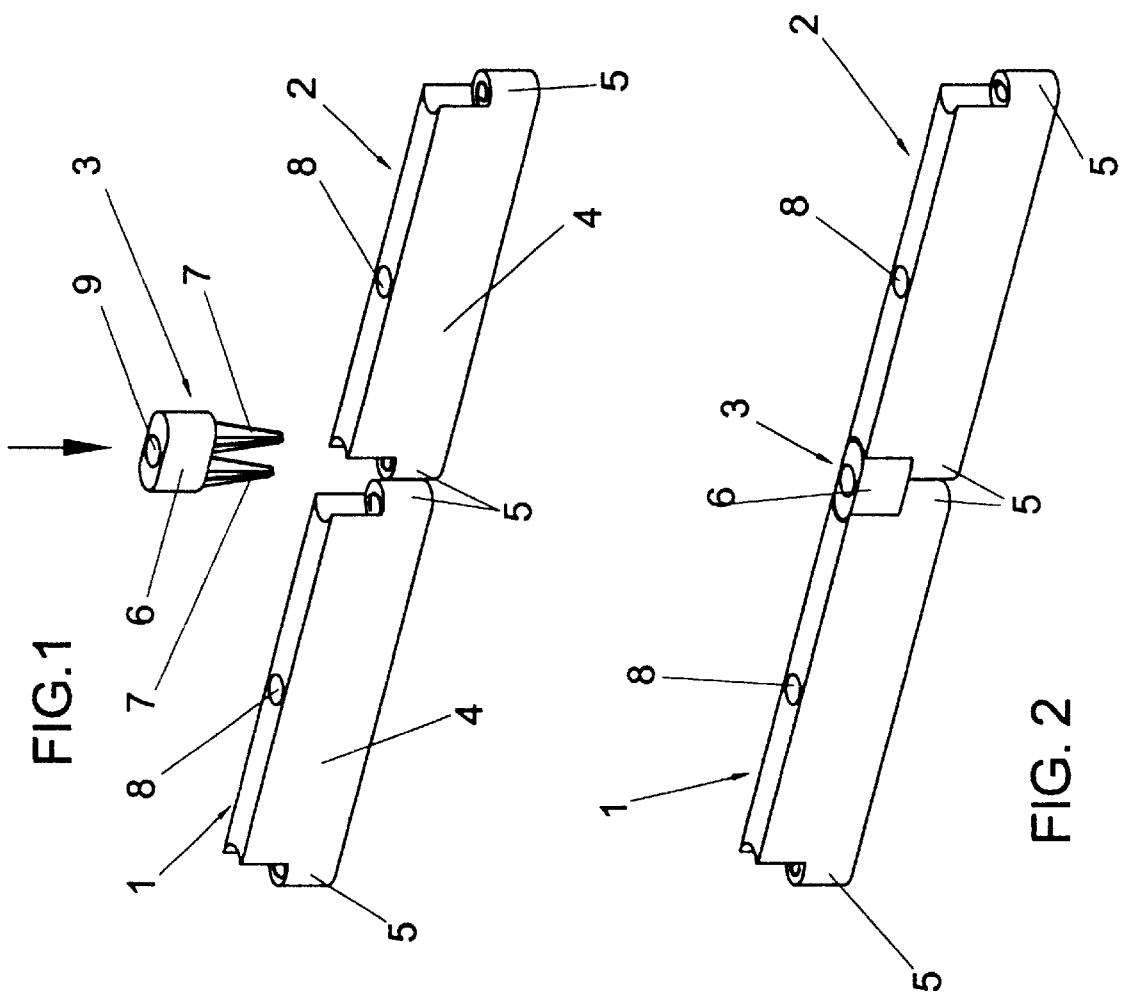
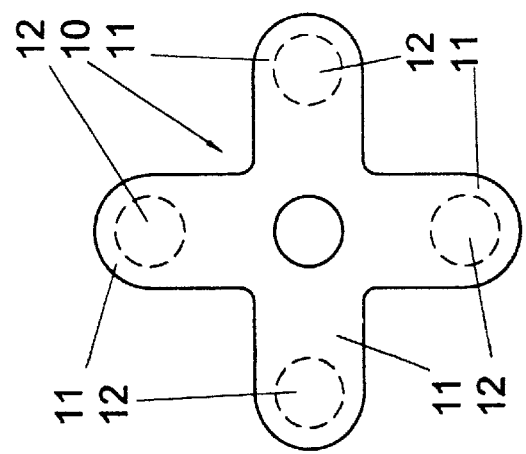

RETAINING WALL FOR RAISED PLANTING BED

FIELD OF THE INVENTION

The present invention relates to a retaining-wall system. More particularly this invention concerns a retaining wall usable to make a raised planting bed.

BACKGROUND OF THE INVENTION

A retaining wall for making a raised bed, starting frame, or the like typically comprises a plurality of wall elements, often formed of plastic of downwardly open U-section joined together at their ends. They are assembled on the ground into an annulus and the growing mixture is filled in the center to form a bed that is well drained and of the proper composition, regardless of the properties of the underlying ground.

In Swiss patent 69,290 two kinds of wall elements are used with complementary interfitting ends that can be joined together by insertion of a connection pin through them. Such a retaining wall must be assembled and disassembled starting from one location.

In German 9,107,366 a similar system is shown where connection eyes are provided at the ends of the wall elements so that rods can couple them together. This leaves an open gap between the ends through which the growth medium can leak out.

U.S. Pat. No. 4,869,018 of Scales shows a system where the wall elements are all identical, having one end with an upper connection eye and an opposite end with a lower connection eye. When the upper eye of one element is aligned above the lower eye of another a stake can be set through the aligned eyes to anchor the system and fasten together the wall elements. It is somewhat difficult to alter the shape of such a retaining wall and it must normally be assembled starting at one end. Once filled, an element cannot be removed and replaced, and the wall shape cannot be changed conveniently.

European 0,716,803 of Kulenkampff shows an arrangement where a wall element is formed at one end with a lower sleeve-like eye formation and at the other end with a longitudinally projecting tab provided with a long downwardly projecting spike. When the spike of one wall element is forced downward through the eye of an adjacent element, it not only couples the two elements together, but also anchors them to the ground.

All of these systems have several defects. They are invariably limited to systems where the wall elements are set at an angle of 90° or more, but never less, relative to one another. Furthermore it is impossible to form T- or X-shaped joints to segregate one bed from another within an outer perimeter. Adding wall sections to existing such retaining walls is very difficult or impossible once they are put together due to the alternating nature of the couplings. The known systems are limited to simple installations and cannot normally be modified once they are assembled and the bed is formed within their outline.

OBJECTS OF THE INVENTION

It is therefore an object of the present invention to provide an improved retaining-wall system.

Another object is the provision of such an improved retaining-wall system which overcomes the above-given disadvantages, that is which is easily assembled, dissassembled, and added to.

A further object is to provide such a system where the wall elements can be joined at acute angles to one another to form, for example a pie-like array of growing beds.

SUMMARY OF THE INVENTION

A retaining-wall system has according to the invention a plurality of substantially identical wall elements each having an elongated and downwardly open body with opposite ends each formed with a connection having an upwardly directed connection formation and at least one splice element having a body engageable between the wall elements above the connections and having a pair of downwardly directed connection formations complementarily interfittable with the upwardly directed connection formations of the wall elements.

In other words, the instant invention is a retaining-wall system comprising a pair of substantially identical walls having longitudinally extending and upwardly directed top wall surfaces and longitudinally juxtaposed and stepped longitudinal ends. Each such stepped longitudinal end is formed with a longitudinally protruding lower end portion having an upwardly directed top end-portion surface spaced substantially below the top wall surface and a horizontally directed lower end surface below the top end-portion surface. The lower end portions abut one another and each longitudinal end further has an upwardly directed lower connection formation at the top end-portion surface and a horizontally directed upper end surface extending between the respective top end-portion surface and the respective top wall surface and set longitudinally back from the respective lower end surface. Thus confronting upper end surfaces and the adjacent end-portion top surfaces form an upwardly open recess. A splice body overlying the abutting lower end portions and substantially filling the recess has a body top surface horizontally level with the top wall surfaces and is formed with upper downwardly directed upper connection formations fitting with and complementary to the respective upwardly directed lower connection formations. In this manner the splice body joins the walls.

With this system the walls can be joined at virtually any angle to each other due to the use of a separate two-formation splice element. According to the invention the formations extend vertically. Minor irregularities in the underlying ground are not a problem as the splice elements are installed from above, making alignment easy and similarly making it easy to disassemble a wall section if necessary. It is easy to remove any one wall section, for instance if it has been damaged, and replace it without disrupting the bed or at all disturbing the flanking wall elements.

When the splice element has three arms each provided with a respective such connection formation, three wall elements can be joined by the splice element. In fact a four-arm system allows the formation of an X-shaped joint if desired. In the three-arm system the splice element can be T-shaped with the respective connection formations lying on points of a triangle or alternately the connection formations of the splice element can be arrayed in a straight row. In the former system two generally longitudinally aligned walls can be joined to one going off transversely, while in the latter system the end of the third wall is positioned between the ends of the two aligned walls.

The splice element can be formed with a downwardly projecting spike engageable into the ground beneath the wall elements. Similarly the wall elements can be formed between their ends with vertically throughgoing holes so that stakes through the holes can anchor the system.

In accordance with the invention the formations of the wall elements are upwardly open sockets and the formations of the splice element are downwardly extending pins engageable in the sockets, although it is within the scope of the invention to provide upwardly directed connection pins on the connecters of the wall elements and downwardly open socket holes on the body of the splice element.

The splice element can be formed above each of its connection pins with an upwardly open socket hole. Thus a pin of an upper level of such a wall can be joined to it, to make a double-depth planting bed.

The connection of each wall element is formed as an upwardly open sleeve having a part-cylindrical outer surface. In addition each wall element is formed above the respective connection element with a part-cylindrical surface coaxial with the respective socket. The pins can taper downward and the connections of each wall element project from a lower portion of a respective end of the wall element.

BRIEF DESCRIPTION OF THE DRAWING

The above and other objects, features, and advantages will become more readily apparent from the following description, reference being made to the accompanying drawing in which:

FIG. 1 is a small-scale perspective and partly exploded view illustrating a wall according to the invention;

FIG. 2 shows the wall of FIG. 1 in assembled condition;

FIG. 3 is a large-scale top view of a four-part splice element according to the invention;

SPECIFIC DESCRIPTION

Figure 4:
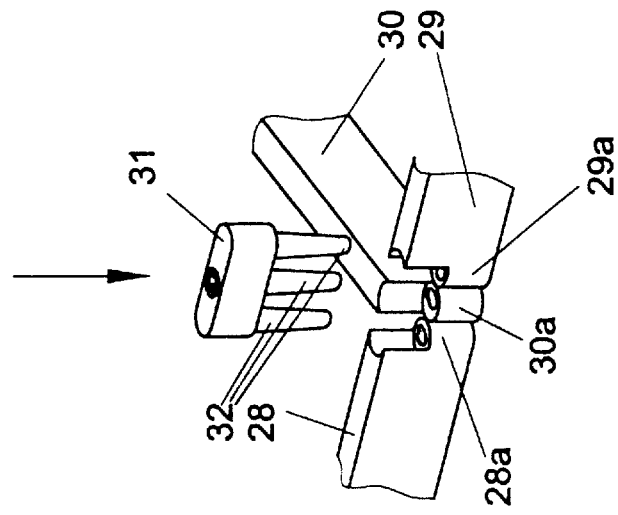
FIG. 4 is a perspective view of a two-part splice element according to the invention.

As seen in FIGS. 1 and 2 a pair of wall elements 1 and 2 are joined together by a splice element 3. Each wall element 1 and 2 has a downwardly open molded plastic body 4 basically formed as a parallelepiped and having at each end a connection 5 formed as a tube or sleeve whose height is equal to half the height of the respective wall element 1 or 2. The splice element 3 has a body 6 formed with a pair of downwardly directed and adjacent connecting pins 7 that fit into the sleeve connections 5 to couple the two wall elements 1 and 2 together. The connections 5 are of part-cylindrical outer shape and the ends of the bodies 4 are formed above them with complementary semicylindrical surfaces and the ends of the body 6 of the splice element 3 are similarly shaped so the elements 1, 2, and 3 fit complementarily together and can pivot about the axes of the holes in the connections 5.

Vertically throughgoing holes 8 and 9 are formed in the elements 1, 2, and 3 so that stakes can be inserted therethrough for holding up screening, stabilizing the structure, or other purposes. In addition it is within the scope of the invention to provide the pins 7 on the connections 5 and complementary holes in the body 6 for the same effect.

FIG. 3 shows a splice element 10 having four arms 11 each formed with a coupling pin 12 like the pins 7. Such an element 10 can join four such wall elements 1 and 2.

In FIG. 4 another splice element 13 having a body 14 and square-section tapered pins 16 is shown. Each of the pins 16 is coaxial with a complementary upwardly open socket hole 15 that can receive the lower end of one of the pins 16 of an overlying such splice element 13 so that high walls can be built.

Figure 5:
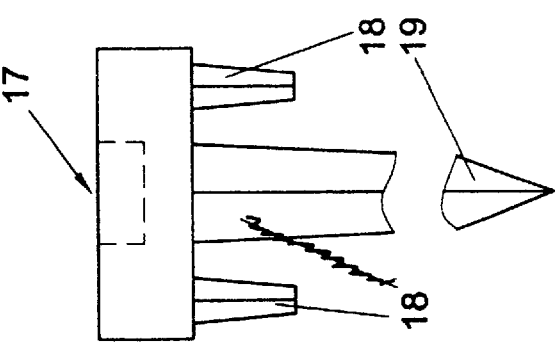
FIG. 5 is a side view of a variation on the two-part splice element.

In FIG. 5 a splice element 17 is shown having standard pins 18 and a much longer central spike 19. This latter spike 19 can be driven into the ground to anchor and stabilize the structure it is part of.

Figure 6:
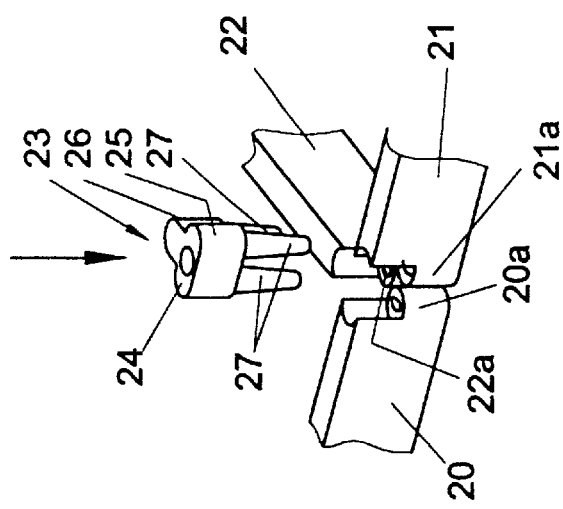
FIG. 6 is a small-scale perspective and partly exploded view illustrating a joint between three walls in accordance with the invention.
Figure 7:
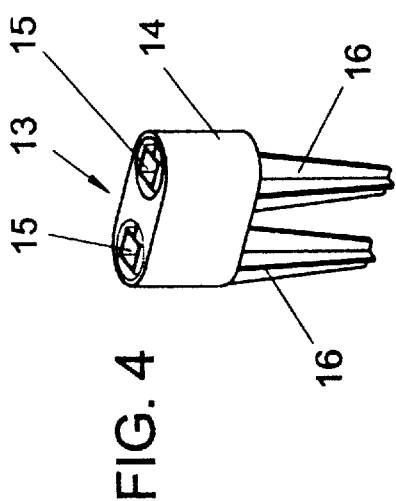
FIG. 7 shows the joint of FIG. 6 in assembled condition.

The system of FIGS. 6 and 7 has three wall elements 20, 21, and 22 with standard end connections 20a, 21a, and 22a. The walls 20 and 21 are longitudinally aligned and the wall 22 extends at a right angle from them. A T-shaped splice element 23 has three arms 24, 25, and 26 each formed with a connecting spike 27 for joining together the thus oriented walls 20, 21, and 22.

Figure 8:
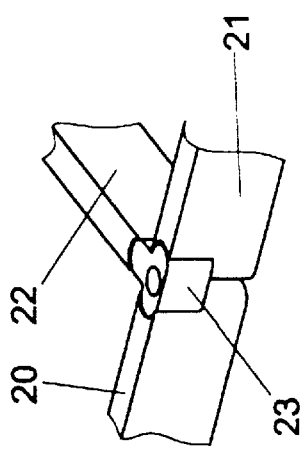
FIG. 8 is a small-scale perspective and partly exploded view illustrating another joint between three walls according to the invention.

In FIG. 8 three walls 28, 29, and 30 with end connections 28a, 29a, and 30a are oriented with the two walls 28 and 29 coaxial but spaced and the end connection 30a between the end connections 28a and 29a. A splice element 31 with three in-line connection pins 32 serves to secure these walls 28, 29, and 30 together. As in FIGS. 6 and 7, once thus secured they can still be pivoted about the axes of the respective pins, forming other than right angles.

I claim:
1. A retaining-wall system comprising:
a pair of substantially identical walls having longitudinally extending and upwardly directed top wall surfaces and longitudinally juxtaposed and stepped longitudinal ends each unitarily formed with
a longitudinally protruding lower end-portion having an upwardly directed top end-portion surface spaced substantially below the top wall surface and a horizontally directed lower end surface below the top end-portion surface, the lower end portions abutting one another,
an upwardly directed lower connection formation at the top end-portion surface, and
a horizontally directed upper end surface extending between the respective top end-portion surface and the respective top wall surface and set longitudinally back from the respective lower end surface, whereby confronting upper end surfaces and the adjacent end-portion top surfaces form an upwardly open recess; and
a splice body overlying the abutting lower end portions, substantially filling the recess, having a body top surface horizontally level with the top wall surfaces, and formed with upper downwardly directed upper connection formations fitting with and complementary to the respective upwardly directed lower connection formations, whereby the splice body joins the walls.

2. The retaining-wall system defined in claim 1 wherein the lower end surfaces substantially longitudinally abut each other and the splice body has two such upper connection formations.

3. The retaining-wall system defined in claim 1 wherein there are three such walls and the splice body has three such upper connection formations.

4. The retaining-wall system defined in claim 3 wherein the splice body is T-shaped and the upper connection formations lies on points of a triangle.

5. The retaining-wall System defined in claim 3 wherein two of the walls are longitudinally aligned with their lower end surfaces longitudinally spaced and flanking the lower end portion of the third wall, the splice body being elongated and the upper connections formations being arrayed in a straight row.

6. The retaining-wall system defined in claim 1 wherein there are four such walls and the splice body has four such upper connection formations.

7. The retaining-wall system defined in claim 1 wherein the lower connection formations are upwardly open sockets and the upper connection formations are downwardly extending pins.

8. The retaining-wall system defined in claim 7 wherein the splice body is formed above each pin with an upwardly open socket.

9. The retaining-wall system defined in claim 7 wherein the pins taper downward.

10. The retaining-wall system defined in claim 1 wherein each upper end surface is outwardly concave and the splice body has oppositely directed end surfaces complementarily fitting with the upper end surfaces.

11. The retaining-wall system defined in claim 10 wherein the end surfaces are part cylindrical.

12. The retaining-wall system defined in claim 1 wherein each wall is formed between its end portions with upwardly open socket holes.

13. The retaining-wall system defined in claim 1 wherein the formations are centered on respective vertical axes and the end surfaces are also centered on the respective axes.

* * * * *